United States Patent [19]

Yamaguchi et al.

[11] Patent Number: 5,350,547
[45] Date of Patent: Sep. 27, 1994

[54] METHOD OF RETRIEVING CONDITIONS FOR MOLDING USING EXPERT SYSTEM

[75] Inventors: Hiroyoshi Yamaguchi; Shuji Murai; Tatsuo Mimura, all of Kanagawa, Japan

[73] Assignee: Kabushiki Kaisha Komatsu Seisakusho, Japan

[21] Appl. No.: 952,639

[22] Filed: Nov. 30, 1992

[30] Foreign Application Priority Data

May 31, 1990 [JP] Japan ................. 2-142555

[51] Int. Cl.$^5$ ............................................. B29C 45/76
[52] U.S. Cl. ................................. 264/40.1; 364/476; 425/135; 425/162
[58] Field of Search .............. 264/40.1, 40.4, 40.5; 364/476; 395/900, 184, 551.01; 425/135, 140, 141, 145, 162, 173

[56] References Cited

U.S. PATENT DOCUMENTS

| | | | |
|---|---|---|---|
| 5,035,598 | 7/1991 | Fujita et al. | 264/40.3 |
| 5,135,688 | 8/1992 | Nakamura et al. | 364/476 |
| 5,149,472 | 9/1992 | Suganuma | 364/476 |
| 5,173,224 | 12/1992 | Nakamura et al. | 364/476 |
| 5,176,858 | 1/1993 | Tsukabe et al. | 264/40.1 |
| 5,195,029 | 3/1993 | Murai et al. | 364/476 |

FOREIGN PATENT DOCUMENTS

| | | |
|---|---|---|
| 0368300 | 5/1990 | European Pat. Off. . |
| 3830571 | 4/1989 | Fed. Rep. of Germany . |
| 4108992 | 9/1991 | Fed. Rep. of Germany . |
| 61-248723 | 11/1986 | Japan . |
| 63-209917 | 8/1988 | Japan . |
| 2-128820 | 5/1990 | Japan . |

OTHER PUBLICATIONS

Patent Abstracts of Japan, vol. 15, No. 171, Apr. 30, 1991.

*Primary Examiner*—Jill L. Heitbrink
*Attorney, Agent, or Firm*—Graham & James

[57] ABSTRACT

An expert system for retrieving molding conditions, in which a statistical technique is added to the functions of the conventional expert system, causes of defects are inferred from the records of countermeasures taken and inputted defect occurrence situation, conditions for temporary molding are obtained while repeating test molding, qualitative defects are extracted from defects occurred, a boundary of a region in which defects occur is determined with decision analysis of qualitative defects extracted with the use of the record of countermeasures as above, a condition for molding to eliminate the qualitative defects is determined on the basis of the boundary of region of defects occurrence, quantitative defects are extracted from defects occurred, and molding conditions for eliminating the quantitative defects are determined by performing analysis of variance depending on design of experiment with the quantitative defects extracted from the record of countermeasures, whereby the frequency of experiment is greatly reduced in executing statistical technique, countermeasures to a plurality of defects causing mutual actions are taken readily, and reliability of molding conditions to be obtained is increased.

6 Claims, 8 Drawing Sheets

FLOWCHART OF DETERMINING CONDITIONS
FOR QUALITATIVE DEFECTS

FLOWCHART OF DETERMINING OPTIMAL
CONDITION FOR QUANTITATIVE DEFECTS

ANALYSIS OF VARIANCE IN L4(2,3)    (TOTAL DATA NUMBER = 40)

| PARAMETER | LEVEL | SUM OF SQUARES S | FREEDOM DEGREE F | VARIANCE V | EFFECT E |
|---|---|---|---|---|---|
| INJECTION PRESSURE | (28,32) | .0063 | 1 | .0063 | .205 |
| INJECTION SPEED | (45,55) | .0242 | 1 | .0242 | .789 |
| MEASURE-MENT | (23,27) | .0002 | 1 | .0002 | .006 |
| TOTAL | | .0307 | 3 | | 1.0 |

TARGET VARIABLE Y = +7.949+.028×INJECTION PRESSURE+.022×INJECTION SPEED (CORRELATION COEF. = .987)

DESIGN VALUE ? = 9. 8

COMBINATION OF SMALL VARIANCE (INJECTION PRESSURE ; FIRST LEVEL)
COMBINATION CLOSE TO DESIGN VALUE (INJECTION SPEED ; FIRST LEVEL) (MEASURE-MENT ; FIRST LEVEL)
(INJECTION PRESSURE ; SECOND LEVEL) (INJECTION SPEED ; FIRST LEVEL) (MEASURE-MENT ; FIRST LEVEL)

EXAMPLE OF ANALYSIS OF VARIANCE

FIG.9

METHOD OF RETRIEVING CONDITIONS FOR MOLDING USING EXPERT SYSTEM

TECHNICAL FIELD

The present invention relates to a method of retrieving conditions for molding which is applied to technological fields such as plastic injection molding, and more particularly, to a method of retrieving molding conditions using an expert system.

BACKGROUND ART

An expert system for supporting injection molding technique which systemizes the accumulated experiences and knowhows that experienced technicians acquired in actual molding sites has recently been developed in the plastic molding field.

The aims of the injection molding support expert system are:
 To improve efficiency in setting molding conditions
 To provide database for experiences and knowhows
 To educate and train unexperienced technicians The injection molding support expert system determines the molding conditions by the following two steps.

Process 1 Initializing Molding Conditions

Taking the characteristics of molding machines, materials, molds, etc. into consideration, the molding conditions for the first trial injection are inferred.

Process 2 Setting Molding Conditions

The causes of problems are inferred based on the situations in which the problems occurred and the records of countermeasures taken against the problems. The molding conditions are modified according to the causes thus inferred.

However, with such a conventional injection molding support expert system, since molding conditions are determined without taking mass production into consideration, the inferred molding conditions are not considered to be optimized.

The optimal molding conditions are:

(1) The molding error be suppressed within its allowable range.
(2) No defects occur in molded products by disturbances during mass production operations.

It is very difficult even for skilled technicians to determine the optimal conditions from their experience and knowhow, taking molding errors and disturbances into account. For this reason, in the current process, these factors are not taken into consideration in the conventional system.

Recently, studies of determining the optimal molding conditions by using statistical techniques based on quality control techniques started in injection molding machine fields.

As one of such statistical techniques parameter design methods, there is a parameter design method which determines the optimal conditions by tests and experiments in different process conditions. This method is conducted according to the following procedures.

(1) Selecting factors expectedly influencing the quality of products and the levels of scale and factors in experiments.
(2) Conducting trial molding based on an experimental plan to obtain samples.
(3) Measuring notable characteristics of a number of the samples.
(4) Analyzing the measured data and evaluating the controllability and variance in terms of SN ratio. Examining the influences of the condition setting factors on the SN ratio and obtaining optimal conditions by assigning high SN ratios to influential factors.

In the parameter design method, however, in order to cope with a plurality of defects which interact with each other and determining multi-process control pattern of injection velocity and pressure maintenance, a large number of tests and high-level specific techniques are required in determining the influential factors and experimental level. Therefore, there remain many problems in practical use.

DISCLOSURE OF INVENTION

The present invention comprises a first process of inferring causes of a defect from countermeasure records and inputted molding defect condition and determining temporary molding conditions through repetitive molding, a second process of extracting qualitative defects from defects occurred in the first process; performing decision analysis over the extracted qualitative defects with use of the countermeasure records to determine a boundary of a defect occurrence region, and determining molding conditions for removal of the qualitative defects on the basis of the defect occurrence region boundary; and a third process of, after the second process, extracting quantitative defects from the defects occurred in the first process and executing analysis of variance based on design of experiments with respect to the extracted quantitative defects with use of the countermeasure records.

In accordance with the present invention, a statistical technique is added to the function of the conventional expert system.

In the first process, fault diagnosis based on a conventional expert system is carried out to set molding conditions. Through the first process, the molding conditions are set to be closer to its optimal conditions.

Then the second and third process utilizing the statistical technique are executed.

In the second process, qualitative defects are extracted from the defects occurred in the first process, decision analysis is carried out over the extracted qualitative defects with use of the countermeasure records stored in the expert system to determine the boundary of the defect occurrence region, and molding conditions for removal of the qualitative defects are determined on the basis of the defect occurrence region boundary. The molding conditions determined in the second process correspond to a point most away from the defect occurrence region boundary.

In the third process, qualitative defects are extracted from the defects occurred in the first process, analysis of variance based on design of experiment is carried out over the extracted quantitative defects with use of the countermeasure records to determine molding conditions for removal of the quantitative defects.

The third process is carried out after the qualitative defects are removed through the second process, so that the analysis of variance based on the design of experiment can be executed over only the target quantitative defects taken into consideration while suppressing reoccurrence of the non-target qualitative defects.

The word 'qualitative defects' as used herein is referred to as faults that can be identified by the presence or absence of their occurrence as appearance faults, whereas the word 'quantitative defects' is referred to as such faults evaluated in terms of numeric value and variance.

In accordance with the present invention, since the statistical technique is linked to the function of the conventional expert system, the countermeasure records stored in the expert system can be utilized and therefore the frequency of experiment carried out in the statistical technique can be remarkably reduced. Further, in carrying out the statistical techniques, the defects are divided into qualitative and quantitative defects so that molding conditions for removal of the qualitative defects are first determined and then molding conditions for removal of the quantitative defects are determined. Therefore, countermeasures to a plurality of defects which interact with each other are easily obtained and reliability of molding conditions can be improved.

BRIEF DESCRIPTION OF THE DRAWINGS

FIG. 9 shows an example of analysis of variance.

BEST MODE FOR CARRYING OUT THE INVENTION

Figure 1:
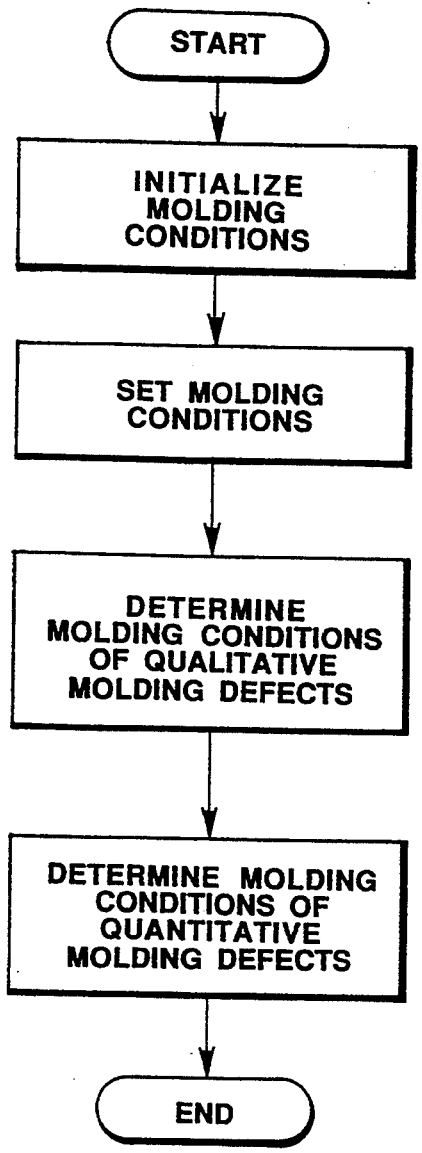
FIG. 1 is a flowchart for illustrating the procedures of the present invention.

The present invention will be explained in connection with an embodiment shown in the attached drawings. In the embodiment, the optimal molding conditions are determined according to the following procedures as shown in FIG. 1.

I. Initializing molding conditions
II. Setting molding conditions
III. Determining molding conditions for qualitative molding defect
IV. Determining molding conditions for quantitative molding defect In these steps, the steps I and II are functional steps conducted in the conventional injection molding support expert system. Explanation will first be made as to the steps I and II.

Figure 2:
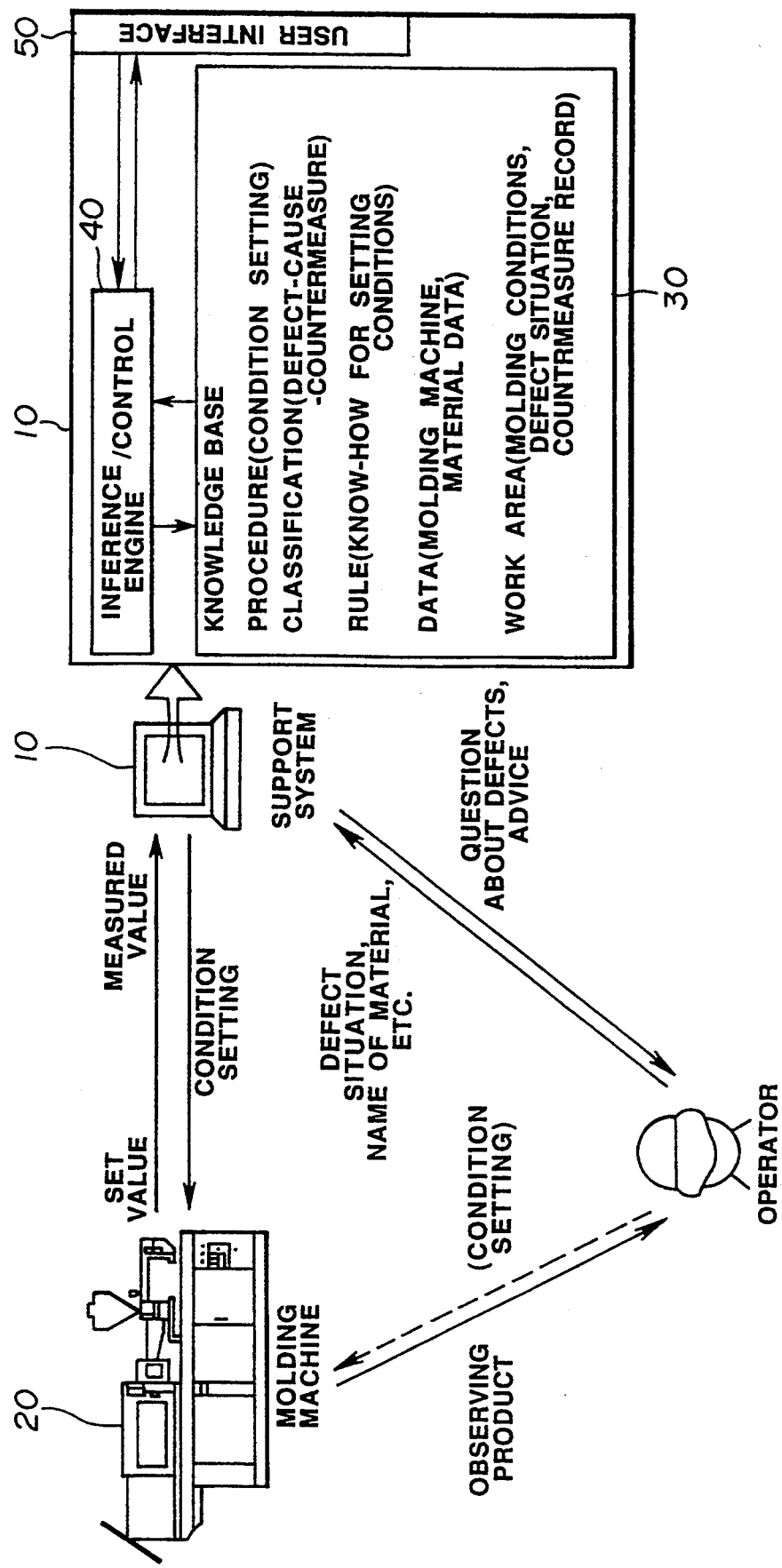
FIG. 2 shows a general injection molding support expert system.

FIG. 2 shows an arrangement of an expert system 10 for execution of the steps I and II. When an operator inputs a defect situation in response to a question from a computer, the expert system 10 infers a cause of the defect and determines the optimal countermeasure.

The expert system 10 is connected on line to an injection molding machine 20, so that set conditions and actually measured data for the molding machine 20 are automatically input to the system 10, molding conditions inferred by the system 10 are automatically set for the molding machine 20, and further the molding machine is automatically operated under control of the system 10. The expert system 10 includes a knowledge base 30 in which various sorts of knowledge necessary for countermeasures against defects are stored, an inference engine 40 for performing inference with use of the knowledge, and a user interface 50 through which the operator inputs defect situation. Stored in the knowledge base 30 are various sorts of knowledge including the knowledge expressed in the form of tables showing relationships between defects, causes and countermeasures, the know-how of setting conditions obtained from experienced technicians, and other sorts of knowledge indispensable for setting the conditions.

When the system 10 is activated, the system 10 asks the operator a question on defect situation necessary for inferring a countermeasure. In response to the question, the operator inputs the detailed situation through the user interface 50. On the basis of operator's input, the system 10 infers the countermeasure and provides a trial injecting operation. Thereafter, the operator again inputs the situation after the injection through the user interface 50. A change in the situation caused by the countermeasure is stored as a countermeasure record to be utilized later upon inferring the subsequent countermeasure.

Inference procedures carried out by the system 10 are as follows.

(1) Determining initial molding conditions

When the operator inputs the characteristics of the molding machine, material and molds, the system infers the first trial injection conditions.

(2) Automatically setting molding conditions and conducting trial injection.

The system automatically sets molding conditions for the injection molding machine 20 to cause the machine to start its automatic operation under the set conditions. After the trial injection, the system receives from the molding machine 20 and stores therein the set values of the molding conditions and actually measured values such as cylinder temperature and injection quantity.

(3) Inputting defect situation and recording countermeasures

The operator inputs through the user interface 50 the type and location of a currently occurring defect, the defect occurrence situation, etc. After modifying the set conditions and conducting the countermeasure, the operator inputs a resultant change in the defect caused by the modification and conduction through the user interface 50. The inputted countermeasure result is stored in the system for later utilization. This recorded data, as already stated above, is referred to as the countermeasure record (records of the molding conditions actually set and the then defect situation change).

(4) Determining the countermeasure

The system infers the defect occurrence cause from the defect occurrence situation and the countermeasure record and on the basis of the inference result, displays a list of several countermeasures. Further, the system evaluates the countermeasures from several respects and determined optimum one of the countermeasures.

(5) Detailing the determined countermeasure

The system infers how the parameters of molding conditions for the presented countermeasure are modified. When the performance of the countermeasure is expected to cause occurrence of serious defects (such as burrs or improper mold release), the system advises the operator to beforehand take a preventive measure against it.

(6) Indicating the determined countermeasure

The system indicates the countermeasure determined in the step (6).

The operator conducts the countermeasure, modifies the inference results at his discretion or instructs the system to retry it. The injection molding support expert system shown in FIG. 2 is intended to remove various types of defects through operator's repetitive interaction with the system.

In this embodiment, the injection molding support expert system of FIG. 2 is used to execute the aforementioned steps I (initialization of molding conditions) and II (setting of molding conditions) and to narrow down the molding conditions to a certain extent. In other words, through the steps I and II, major factors (important molding parameters) to be considered for the occurrence of defects as well as experimental levels (the levels of the respective molding parameters) can be narrowed down. As a result, the experiment and analysis relating to the steps III and IV can be conducted under a so-called less interactive condition. Further, the countermeasure records accumulated in the steps I and II can be utilized in the statistical technique in the steps III and IV.

Next, the steps III and IV based on the statistical technique are executed in this order. In more detail, the present system makes the molding conditions closer to its optimal molding conditions by utilizing the functions of the steps I and II of the conventional injection molding support expert system and then inputs into a statistical technique mode which will be explained below. These steps III and IV based on the statistical technique are used to make molded products with less tolerance variations through molding operation immune to disturbance. It is an important point to execute the steps III and IV in this order.

III. Determining molding conditions for qualitative molding defect

In the step III, an appearance defect such as burr or jetting that can be evaluated by its occurrence or non-occurrence is referred to as the qualitative molding defect. The molding conditions are determined so as to remove the qualitative molding defect. The molding conditions determined in the step III are referred to as the stable conditions.

Molding parameters to be adjusted include quantitative parameters such as resin temperature and injection speed and qualitative parameters such as the type of material and the type of a machine. In the step III, however, only quantitative parameters are adjusted. In the step IV of determining the molding conditions with respect to the quantitative molding defect, adjustment is carried out for both of the quantitative and qualitative molding parameters.

Explanation will be made as to the detailed operation of the step III by referring to a flowchart of FIG. 3. The step III is divided further into sub-steps A, B and C as follows.

Sub-step A

Figure 3:
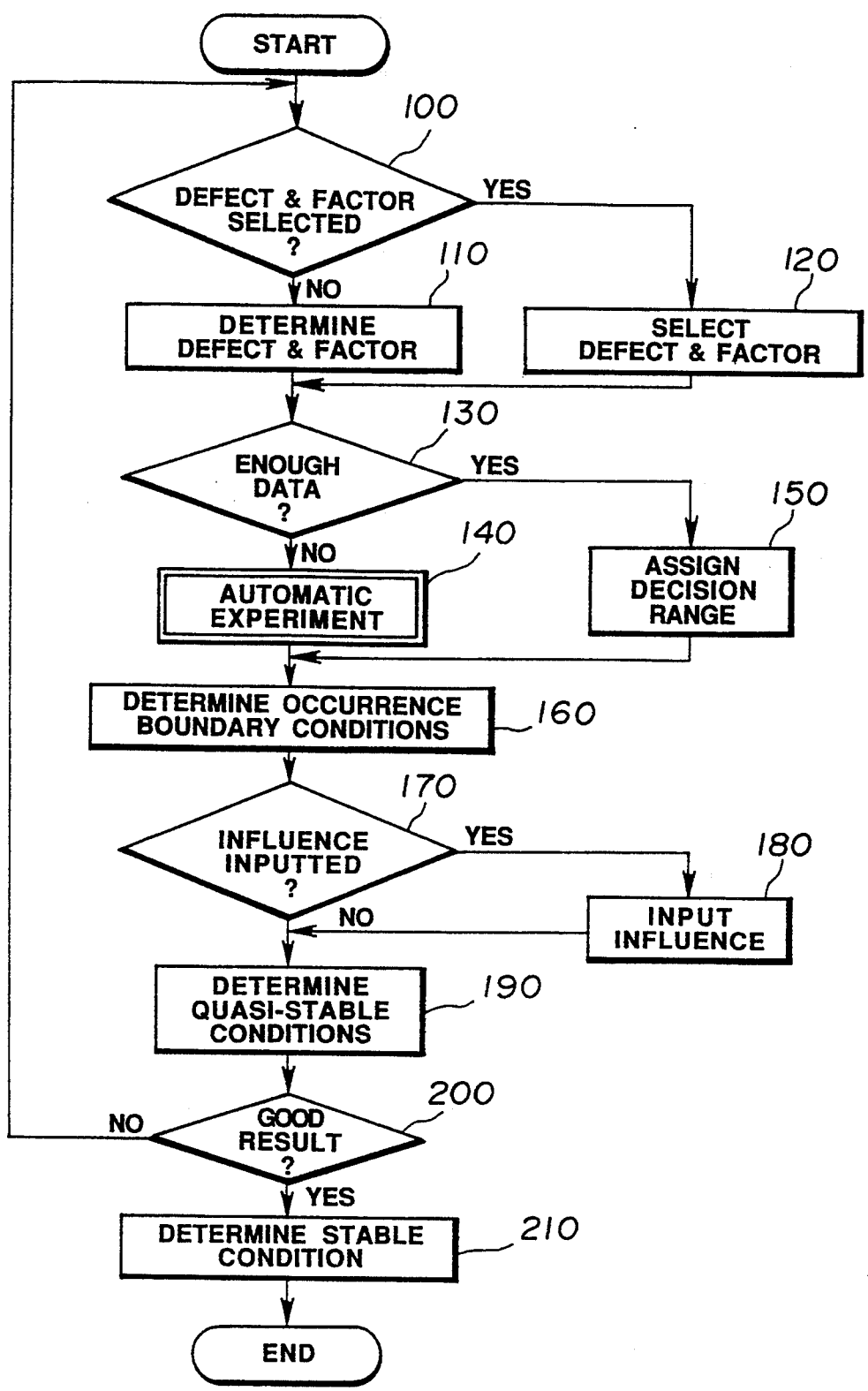
FIG. 3 is a flowchart illustrating the procedures in determining stable molding conditions with respect to qualitative molding defect.

Determining Corresponding Defects and Molding Parameters (Steps 100 to 120 in FIG. 3)

First, qualitative molding defect such as burr or jetting is extracted from defects occurred in the previous step II. It is estimated, on the basis of the countermeasure records stored in the knowledge base, whether or not the qualitative defects occurred in the step II again take place when the values of molding parameters in the molding conditions determined in the step II are modified respectively by a predetermined set amount, and the qualitative defects judged as will again occur and the molding parameters corresponding thereto are selected.

Figure 4:
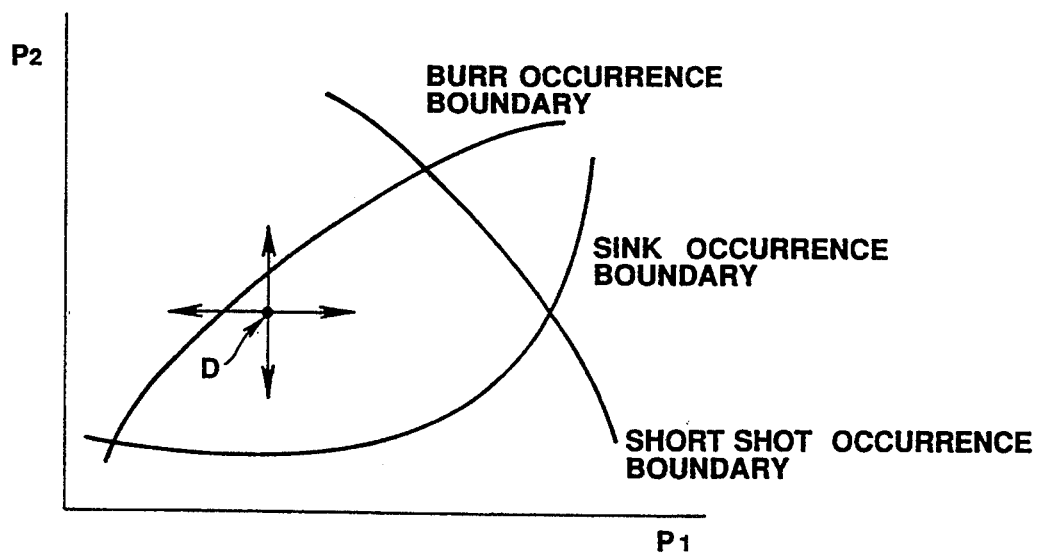
FIG. 4 is a graph illustrating the selecting operation of molding conditions in a stable molding condition calculation step.

For example, in FIG. 4, it is assumed that three qualitative defects of burr, sink mark and short shot took place in the step II and a point D corresponds to the molding conditions determined in the step II. In the case of FIG. 4, it is considered that, when two molding parameters P1 and P2 are modified by ranges shown by arrows, there may again occur only burr of the three qualitative defects and there may not again occur the other defects. Accordingly, in this case, the burr is selected as a qualitative defect expectedly causing the re-occurrence of burr and the parameters P1 and P2 are selected as molding parameters corresponding to the burr.

However, how to set the modified amount of the respective molding parameters requires know-how. Thus, by taking various past cases which show how each parameter is changed by the generation of various sorts of disturbance in mass productions, suitable values are previously determined.

Thus, by conducting the sub-step A, it becomes possible to eliminate the defects which occurred only in the step II and will be unlikely to occur thereafter, as well as the parameters corresponding the defects.

Sub-step B

Determining the Boundary of Region of Defect Occurrence (Steps 130 to 160 in FIG. 3)

For each of the defects selected in the sub-step A, decision analysis in the statistical technique is executed on the basis of the countermeasure records to calculate a boundary surface discriminating between the presence or absence of generation of the defect in an n-dimensional coordinate system of a plurality of the selected molding parameters.

Assume for example that such a countermeasure record as shown in Table 1 below was obtained through the step II.

TABLE 1

| NO. | Hold Pressure | Hold pressure Time | Defect |
|---|---|---|---|
| 1 | 10% | 2 sec. | sink |
| 2 | 30% | 2 sec. | sink, burr |
| 3 | 20% | 3 sec. | sink |
| 4 | 25% | 3 sec. | burr |
| 5 | 20% | 4 sec. | burr |
| 6 | 15% | 4 sec. | Not occurred |

Figure 5:
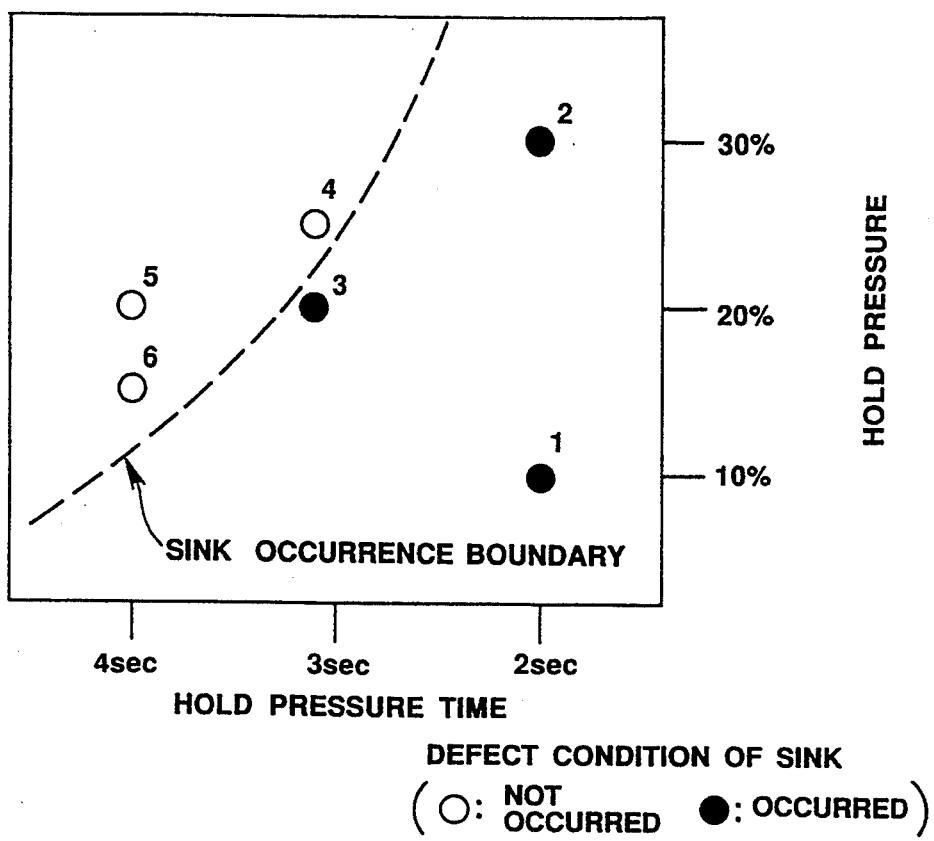
FIGS. 5 to 7 are graphs illustrating the stable molding condition calculation step.
Figure 6:
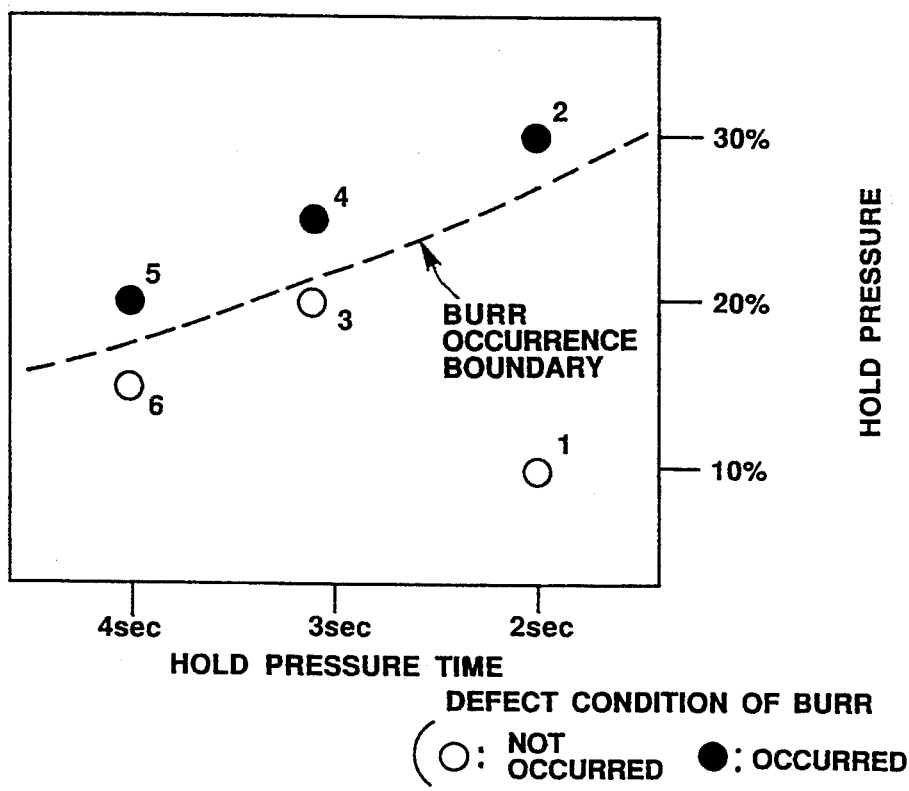

Defect occurrence boundaries of the sink mark and burr determined by the decision analysis on the basis of the countermeasure record are shown by broken lines in FIGS. 5 and 6 respectively. Numbers given in these drawings correspond to the number in Table 1.

Sub-step C

Determining the Stable Conditions (Steps 170 to 200 in FIG. 3)

Molding conditions away from the defect occurrence boundaries determined in the sub-step B are determined and set as quasi-stable molding conditions. More specifically, when two defect occurrence boundaries are determined for example (two-dimension), a circle contacting with the two defect occurrence boundaries is determined and the center of the circle is set as the quasi-stable conditions. That is, the center of the determined circle is a point most away from the defect no-occurrence sides of the respective defect occurrence boundaries.

However, there may occur such a situation that the aforementioned circle cannot be defined when a region enclosed by the above defect occurrence boundaries becomes an open space. In this case, the quasi-stable molding conditions can be determined by either one of the following two techniques.

The first technique is to define a region in an open space. For example, when a countermeasure record as given in Table 1 is stored, defect occurrence boundaries are as shown in FIG. 7 and thus a closed space cannot be defined.

Figure 7:
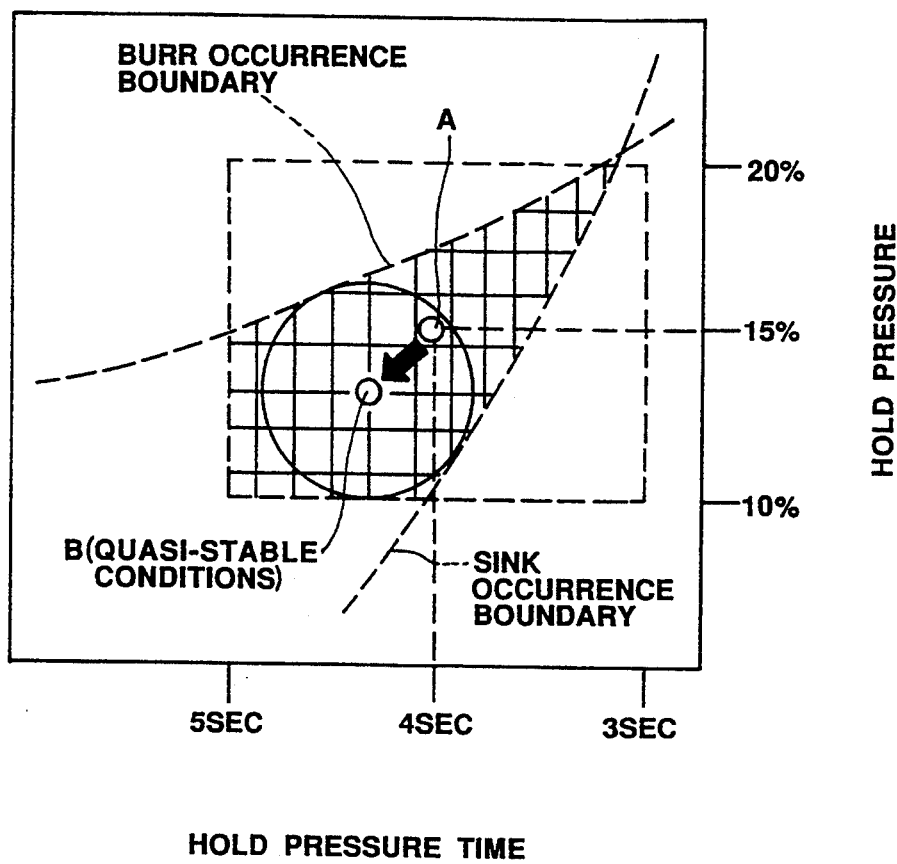

In the case of FIG. 7, a hold pressure of 15% and a hold pressure time of 4 seconds (point A) are temporarily determined as molding conditions through the previous step II and according to the countermeasure record, the hold pressure is changed by each 5% as a unit while the pressure retaining time is changed by each 1 second as a unit. In this case, a polygon (rectangle in the case of FIG. 7) is drawn that has corners spaced from the center A by distances corresponding to the above change units of the parameters, so that a closed space is defined by the polygon and the defect occurrence boundaries. A circle having a maximum radius is determined which contacts with the two boundaries and within the defined closed space. The center (point B in FIG. 7) of the determined circle is set as the quasi-stable molding conditions.

In the second technique, an additional experiment is conducted according to design of experiment to obtain additional data and to thereby generate a closed space enclosed by the defect occurrence boundaries. After such a closed space is determined, a circle contacting with the boundaries having a maximum radius is determined and the center of the determined circle is set as the quasi-stable conditions, in the similar manner to the above case.

Although the above explanation has been made in connection with the two-dimensional case, the present invention may be similarly applied to any n-dimensional case to determine the quasi-stable conditions. In the n-dimensional case, the quasi-stable conditions can be determined on the basis of the principle as described above, although intuitively difficult to understand it.

In this connection, a general equation for a defect occurrence boundary in the n-dimensional case is expressed as follows.

$$A0 A1 \times H1 + A2 \times H2 + \ldots + An \times Hn = 0 \quad (1)$$

where

Hi: Factor (Molding factor including interaction)
Ai: Influence of each molding parameter on defect occurrence When the quasi-stable molding conditions B are determined in this manner, trial injection is carried out under the quasi-stable molding conditions B. When a defect still takes place under the above conditions, the occurrence boundary conditions of the defect are added to re-determine the quasi-stable molding conditions. That is, in the example of FIG. 7, the boundary lines are increased or modified.

When no defect occurs in the above trial injection, such a polygon region (rectangular region in FIG. 7) having the above quasi-stable molding condition point B as mentioned above is again set, a circle contacted with any of the sides of the rectangle having a maximum radius within the closed space defined by the defect occurrence boundaries is determined, and the center of the determined circle is set as a quasi-stable molding condition point B'. Trial injection is carried out under the determined quasi-stable molding conditions B'. When no defect takes place in the trial injection, the quasi-stable molding conditions B are determined as the molding conditions. When a defect takes place under the quasi-stable molding conditions B', the boundary line of the defect is added to again determine the quasi-stable molding conditions.

In the deciding operation of the quasi-stable molding conditions, the closed space (corresponding to a cross-hatched area in the case of FIG. 7) derived to determine the quasi-stable molding conditions is compared with the range of variations in the set parameters caused by disturbance. When the closed space is narrower than the set variation range of the parameters by disturbance, the system returns to the previous step II where the parameter adjusting policy is changed to again execute the step II and then the step III.

In other words, in FIG. 6 for example, in the case where the set range of variations of the hold pressure time in the closed space is about 2 seconds, but the range of variations of the hold pressure time caused by disturbance is more than 2 seconds, the system returns to the step II to change the parameter adjusting policy, to again execute the step II and then the step III.

In this way, quasi-stable molding conditions that satisfies the trial injection and meets the decision conditions of the parameter variation range by disturbance, are employed as the stable molding conditions.

IV. Determining the optimal molding conditions for quantitative molding defect

After the stable molding conditions allowing removal of the qualitative molding defect are determined in such a manner as described above, quantitative defects are extracted from the defects which occurred in the step II.

The extracted quantitative defects include such defects that are evaluated in terms of numeric value and variation as dimension, weight and strength.

When the extracted quantitative defects are subjected to the analysis of variance based on the design of experiment, one of combinations of the molding conditions closest to design values and providing the minimum variation is calculated.

This step IV is carried out after the step III is carried out and the qualitative defects are eliminated, as mentioned above. Generally speaking, when experimental analysis comprising mainly analysis of variance is carried out according to the design of experiment, defects other than defects to be handled are also generated when the quantity of information on the other defects is small. In such a case, analysis accuracy is remarkably reduced. For this reason, in the present system, the stable molding conditions for removal of the qualitative molding defect are first determined and thereafter experimental analysis taking only the objective quantitative molding defect into consideration is carried out.

In the step IV, both of the quantitative and qualitative molding parameters are adjusted as mentioned above.

Figure 8:
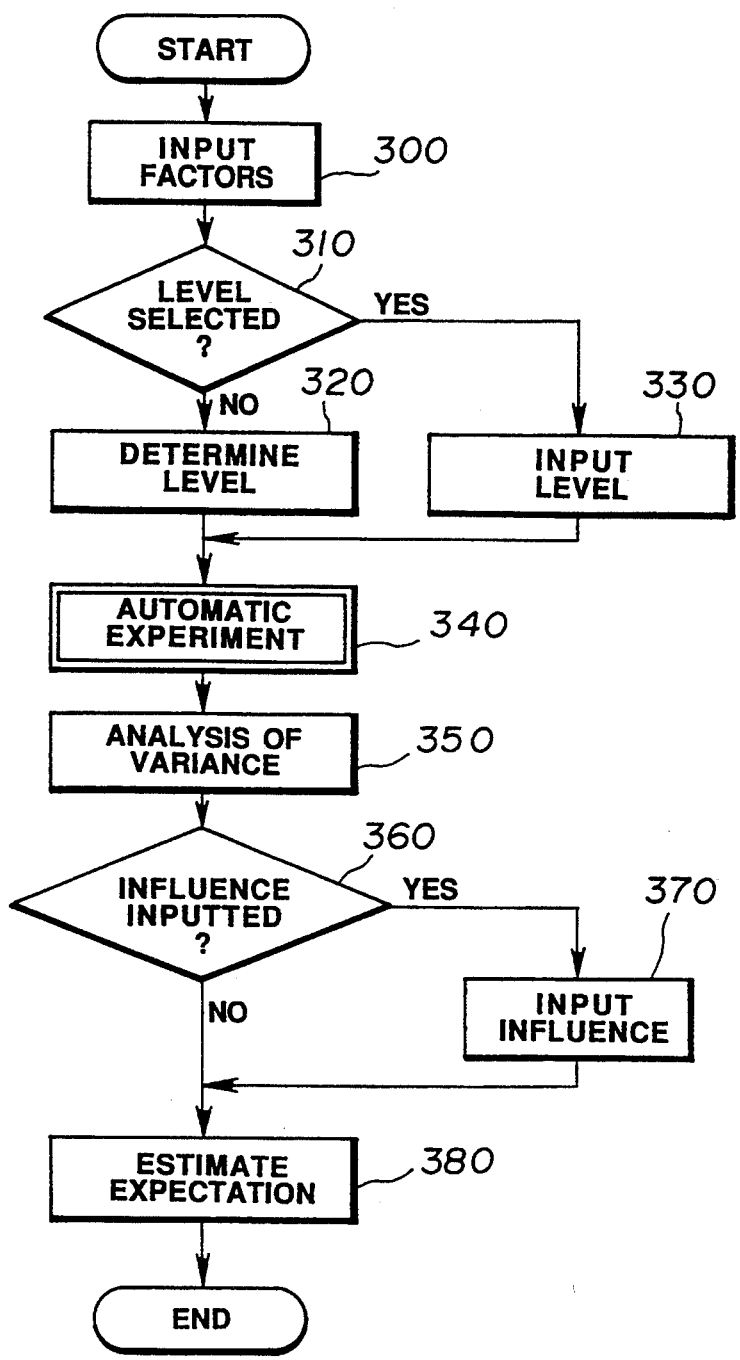
FIG. 8 is a flowchart illustrating the procedures in determining optimal conditions for quantitative molding defect.

FIG. 8 is a flowchart for illustrating the step IV. The step IV is made up of sub-steps A to F.

Sub-step A

Determining molding condition parameters (step 300).

Sub-step B

Selecting experimental levels (steps 310 to 330).

Sub-step C

Automatic experiment (step 340).

In this case, the on-line function with the injection molding machine is utilized to perform a random level test of the design of experiment for realizing automatic experiment.

Sub-step D

Analysis of variance (step 350).

Sub-step E

Inputting an influence Bi (steps 360 to 370).

Sub-step F

Estimating an expectation (step 380).

FIG. 9 is an example of an orthogonal model of L4(2,3) in which a target defect is weight and target molding condition parameters are injection pressure, injection speed and weight.

In the step IV, an expectation for the change in the experimental level can be estimated. When the target molding condition parameter is a quantitative factor, a multiple regression analysis technique is used, whereas when the target parameter is a qualitative factor, Quantification Analysis I is used.

As a result, a general formula is expressed as follows.

$$v = B0 + B1 \times H1 + B2 \times H2 + \ldots + Bn \times Hn \quad (2)$$

where v: Target variable

Hi: Factor (Molding parameter with interaction)

Bi: Influence of each molding parameter on target variable v

In the present method, parameters blocking correlation with the target variable are automatically deleted. Therefore, variable terms in an equation in FIG. 9 are deleted.

When the variance does not fall within its allowable error range by the above analysis of variance, the procedure returns to the step II in which the parameter adjusting policy is changed and the step II is executed again. Thereafter, the steps III and IV are executed again.

In this way, the analysis of variance based on the design of experiments is carried out in the step IV so as to calculate a combination of the molding conditions which is the closest to the designed value and which provides the minimum variance. In this procedure, only the quantitative molding parameters are adjusted in the step III while both of the quantitative and qualitative molding parameters are adjusted in the step IV, as explained above. Thus, there may exist the same adjusting parameter in the both steps III and IV, in which case the countermeasure against the quantitative defect with respect to the parameter is taken in such a range that prevents reproduction of the qualitative defect.

According to the statistical technique of the steps III and IV, as the number of data (countermeasure records) in the knowledge base is larger, other parameters and the interaction therebetween can be taken into consideration in greater extent, whereby estimation accuracy can be increased. With regard to the coefficients Ai and Bi in the equations (1) and (2), these values can be determined nearly perfectly by classifying and arranging the past data for the molding machine, material and molds, respectively.

Although the present invention has been applied to the injection molding machine in this embodiment, the invention may be applied to press molding machines, etc.

INDUSTRIAL APPLICABILITY

The present invention is effectively applied to a plastic injection molding field as an expert system for retrieval of molding conditions.

What is claimed is:

1. A method of molding an article wherein molding conditions are determined using an expert system comprising:

a first process for inferring causes of a molding defect from countermeasure records and inputted defect occurrence situation data and for determining molding conditions through repetitive trial molding;

a second process for extracting qualitative defect data from the defect occurrence situation data, performing decision analysis over the extracted qualitative defects with use of the countermeasure records to determine a boundary of a defect occurrence region, and determining molding conditions for removal of the qualitative defects on the basis of the defect occurrence region boundary;

a third process of extracting quantitative defects from the defect occurrence situation data, executing analysis of variance based on design of experiments with respect to the extracted quantitative defects with use of the countermeasure records, and determining molding conditions for removal of the quantitative defects on the basis of the analysis of variance, the third process being performed after the completion of the second process; and molding an article using the molding conditions for removal of the qualitative defects determined in the second process and the molding conditions for removal of the quantitative defects determined in the third process.

2. A method as set forth in claim 1, wherein the first process includes:

a first step of determining initial molding conditions for a trial injection on the basis of inputted characteristics of a molding machine, material and molds;

a second step of setting the determined initial molding conditions and performing the trial injection;

a third step of inputting situation of a defect occurred in the trial injection and storing a countermeasure record for the defect;

a fourth step of inferring a cause of the defect occurrence on the basis of the defect occurrence situation and the countermeasure record and determining a countermeasure; and a fifth step of determining modifying manner of molding condition parameters on the basis of the countermeasure.

3. A method as set forth in claim 1, wherein the second process includes:

a first step of extracting qualitative defects from the defects occurred in the first process, inferring reoccurrence of the qualitative defects on the basis of the countermeasure records when each molding parameter is modified respectively by a set amount from the temporary molding conditions determined in the first process, and selecting qualitative defects judged as expectedly occur again and molding parameters corresponding to the judged qualitative defects;

a second step of executing decision analysis of each of the qualitative defects selected in the first step on the basis of the countermeasure records to calculate a defect occurrence region boundary in an n-dimensional coordinate system of the plurality of the selected molding parameters; and a third step of determining quasi-stable molding conditions apart from safety side of the defect occurrence boundary determined in the second step, perform repetitive trial injection under the quasi-stable molding conditions, and determining the quasi-stable molding conditions causing no occurrence of the defects as stable molding conditions.

4. A method as set forth in claim 3, wherein the molding parameters are qualitative molding parameters.

5. A method as set forth in claim 1, wherein the third process includes:

a first step of extracting the quantitative defects from the defects occurred in the first process and determining molding condition parameters from the temporary molding conditions determined in the first process;

a second step of determining experimental levels;

a third step of performing automatic experiment;

a fourth step of performing analysis of variance;

a fifth step of inputting an influence degree; and a sixth step of calculating one of combinations of the molding conditions closest to design values and providing minimum variance.

6. A method as set forth in claim 5, wherein the molding condition parameters comprise qualitative and qualitative molding condition parameters.

* * * * *